Feb. 28, 1961 T. H. ROGERS 2,973,445

DEVICE FOR DETECTION, CONVERSION, AND AMPLIFICATION OF X-RAY IMAGES

Filed March 9, 1951 2 Sheets-Sheet 1

INVENTOR

THOMAS H. ROGERS

BY John C. Dorfman

ATTORNEY

INVENTOR
THOMAS H. ROGERS
BY John C. Dorfman
ATTORNEY 2,973,445
Patented Feb. 28, 1961

2,973,445

DEVICE FOR DETECTION, CONVERSION, AND AMPLIFICATION OF X-RAY IMAGES

Thomas H. Rogers, New Canaan, Conn., assignor, by mesne assignments, to The Machlett Laboratories, Incorporated, Springdale, Conn., a corporation of Connecticut Filed Mar. 9, 1951, Ser. No. 214,740

16 Claims. (Cl. 313—67)

This invention pertains to the conversion of an X-ray image into a television picture. More particularly it concerns a pick-up tube by means of which an X-ray image may be converted into a picture on a television screen using conventional television circuitry and methods.

The primary object of my invention is to convert an X-ray image of any subject into suitable video signals which may in turn be suitably amplified by means of a video amplifier and transmitted either on a wired video channel or by television broadcasting to a television receiver or receivers where the image is reconverted into a visible image on the screen of the television receiving tube. My invention will permit remote viewing of the X-ray image of a subject so that doctors or other persons not in the immediate presence of the subject may nevertheless see the equivalent of his fluoroscopic X-ray picture. It will also make possible the viewing of his own fluoroscopic picture by the subject of the examination, thus in many cases saving the time, expense and trouble of making X-ray pictures. It, furthermore, permits enlargement of the picture and/or multiple viewing of the subject's X-ray image so that a great many people can see the same picture at the same time.

It is also an important object of my invention to provide means for amplifying the intensity of very weak X-ray images so that they may be observed visually without loss of detail due to the limitations of the human optical system. X-ray images, as conventionally viewed by means of fluoroscopes are generally of such low intensity that the visual acuity of the human eye at the levels of luminosity produced is too low to permit the observation of fine details of structure in the subject under observation. Any attempt to increase the brightness by increasing the initial intensity of the X-ray beam will quickly cause the tolerance of the subject, in the case of a human subject, to be exceeded. It has thus been considered highly desirable to intensify the brightness of the visual image without increasing the intensity of the X-ray beam.

Various means of converting the X-ray image into video signals so as to permit their amplification by means of wide band amplifier techniques commonly employed in television practice have been proposed. Conventional television cameras have been employed for this purpose by focussing the camera on a conventional fluoroscopic screen on which the X-ray image has been converted into a light image. The sensitivity of this type of device has been too low, however, to permit its utilization successfully except for relatively thin parts of the human body, since the amount of radiation which penetrates thick body parts is not sufficiently intense to excite a fluorescent screen to a sufficiently high level of luminosity to actuate the camera tube.

Other attempts have been made to accomplish this same result by employing a fluorescent screen in contact with a photo emissive screen within the pick-up tube. While it represents advance in the art, this type of tube is not as sensitive as that of my invention and is structurally more complicated.

By my invention a pick-up tube is used which will respond directly to the influence of X-rays without passing through a visible light or photo emission stage. This tube will, at the same time that it picks up the X-ray image, convert the energy received into an amplified electron signal, wherein the energy effect of the X-rays is multiplied. This effect makes possible a more intense image having greater contrast than is currently possible using means known to the X-ray art. Thus, by my invention, in lieu of the conventional photo sensitive material used in television pick-up tubes, crystals of material having the property of permitting the flow of thousands of electrons for each photon of X-ray energy supplied are employed. Cadmium sulphide is a particularly good energy amplifier of this type. (See "The Journal of Applied Physics," April 1950, an article by Rudolph Frerichs on page 312.) Normally a very good insulator, cadmium sulphide not only becomes conductive when irradiated with X-rays but has this tremendous amplifying effect. Germanium is another material of this class, but it is perhaps not as spectacular in its amplifying effects as cadmium sulphide. This amplifying effect is known in the art and may be briefly described as a triggering action whereby X-ray photons produce ionization of atoms within the crystals in such a way to cause the rise of electrons to the conduction band. Thus the degree of conductivity of these materials rapidly increases with the intensity of the X-ray irradiation to which they are subjected.

In accordance with my invention crystals having such X-ray sensitive effects are utilized in tubes more or less similar to conventional types of television pick-up tubes. Therein cadmium sulphide, or other X-ray sensitive material, replaces the photo sensitive material. In each of these tubes cadmium sulphide crystals are individually conductively affixed to a conductive backing plate, which in most cases is X-ray transparent, in a mosaic of mutually non-contacting elements. An electron beam scans this mosaic. In the absence of X-rays the mosaic surface of the screen becomes charged by the scanning electron beam. In various types of tubes the mechanism of charging may vary. The most satisfactory employ a beam having low energy as it approaches the screen so that the screen surface becomes negatively charged. In tubes employing high energy beams, it is possible for the screen to become positively charged because each high speed beam electron tends to knock out several secondary electrons from the screen's surface. No matter what the polarity of the charge, however, a gradient is created between the scanned surface of the crystals and the screen's conductive backing. When the X-ray image irradiates the mosaic, those crystals more intensely irradiated will have many more electrons released to conduction bands. These conduction band electrons will in turn permit the amplified flow of electrons in such a direction as to neutralize the gradient, i.e., tending to bring the mosaic surface of the particular crystal to the same potential as the conductive backing. As soon as the electron beam charges a particular crystal, its charge will begin to leak off in this manner. The rate of leakage will vary among individual crystals dependent on the intensity of X-radiation acting on each one, so that a charge pattern corresponding to the X-ray image will appear on the screen. When the beam again scans the screen, each crystal in turn will recharge. The variation in the recharging current constitutes a signal identical in nature to video signals normally produced in television pick-up tubes. Hence, they may be fed into a wide band amplifier where they will be handled exactly as video signals in any conventional television transmitter. The arrangement and functioning of such a tube is, of course, subject to the usual variations in television tubes for visual light signals.

For a better understanding of this invention reference is made to the following drawings.

Figure 1:
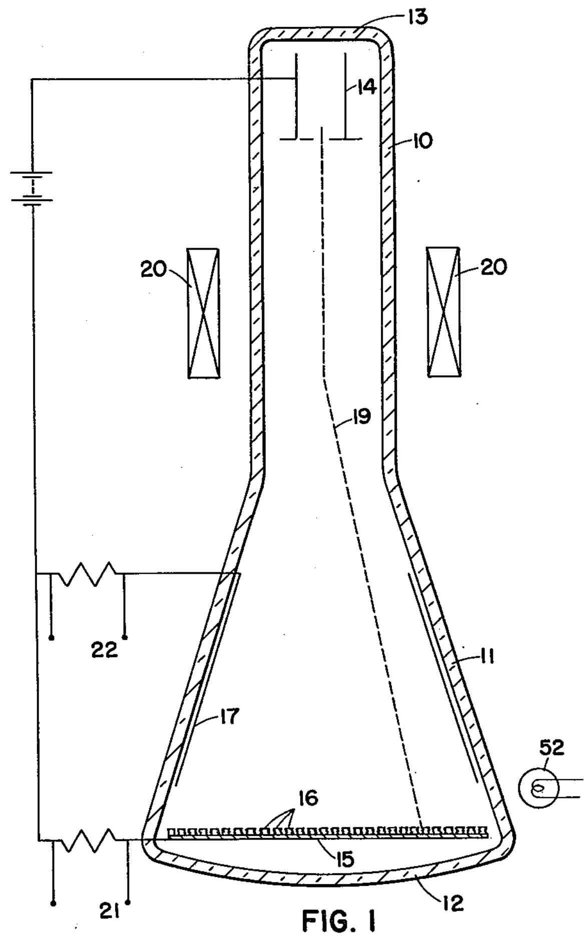
Fig. 1 is a sectional, essentially schematic drawing illustrating one type of X-ray image pick-up tube.

Referring to Fig. 1 an X-ray image pick-up tube of the so-called storage type is indicated schematically. As shown its vacuum envelope has a narrow neck 10 affixed to a conical segment 11 which terminates in an X-ray permeable end member or window 12. The end 13 which closes the neck is advantageously made reentrant rather than essentially planar as shown. When made reentrant, the electron gun 14 which acts as an electron beam forming means may be mounted on the reentrant portion and a stem press for the various leads to the filament, cathode, the negatively biased control electrode and the various positively biased accelerating electrodes formed thereon. Within the conical portion of the tube 11, remote from the electron gun and proximate the X-ray window 12, is a screen composed of a conductive backing 15 upon which is conductively affixed a mosaic of crystals 16, advantageously cadmium sulphide. These crystals should be applied preferably in such a manner that each crystal is individually conductively affixed to the conductive backing 15 while being located in mutual non-conducting relationship with other crystals of the mosaic. This will minimize conduction of electrons from one crystal to another which tends to produce blurred or distorted signals. It will also enable each crystal to effectively perform its function as an individual amplifying element when irradiated by X-rays. The conductive backing 15 is advantageously constructed of aluminum sheet or other material highly transparent to X-rays. Anode 17 collects those electrons ejected from or repelled by the screen and is advantageously composed of a thin conductive coating painted onto the conical tube side walls 11.

In the operation of this tube, the electron beam 19 produced by electron gun 14 is caused to scan the surface of the crystal mosaic 16 by beam deflection means 20, advantageously located outside of the vacuum envelope. The mechanism of causing a beam to scan is well known in the art, so that the deflection of the beam as well as the deflection means, are only indicated schematically. Since the electron beam employed here is in no way decelerated before striking the mosaic surface of the screen, its energy upon impact is sufficient to knock out secondary electrons. The number of secondaries knocked out of the screen will depend upon the energy of the scanning beam at the screen. Thus it is possible to knock out more electrons than are added to the screen by beam electrons. Under these conditions, the screen would become positively charged. Whereas it might be possible to operate the tube under these conditions, the presence of so many secondary electrons seems undesirable particularly in light of experience in the television field. By adjusting the potentials on the positively biased screen backing 15 and the collecting anode 17, the energy of the scanning electron beam may be controlled so that the ratio of secondary to beam electrons will never equal or exceed one. By doing this, in the absence of X-rays, the scanning beam will charge the mosaic surface to cathode potential. There is a tendency for this charge to leak away to the conductive backing. When an X-ray image enters the tube through window 12, passes through conductive backing 15, and irradiates the mosaic, those crystals more intensely irradiated will permit the negative charge built up on the crystals to leak off more rapidly. This leakage current will be greatly amplified due to the raising of electrons in atoms within the crystal to the conduction band, the number of electrons so raised being dependent upon the intensity of irradiation. Thus, the rate of discharge of any particular crystal is dependent upon the amount of X-radiation to which it is subjected. Since different amounts of charge will leak off different crystals in the period between each scanning of the electron beam, various crystals will assume different average potentials dependent on the intensities of "lights and shadows" in the X-ray picture. In the instant that the electron beam impinges a particular crystal the mosaic surface of that crystal will tend to charge to cathode potential. The essentially instantaneous negative charging of the beam side of the crystal will cause positive charging of the opposite side of the crystal by induction. Thus electrons will flow away from that side of the crystal, through the plate, and back to the cathode. The variation in charge on the various crystals will produce a variation in electron flow at the instant of scanning these crystals. This varied electron flow is identical in nature to the video signal from a television pick-up tube. This signal may be taken from the tube at some point between the screen 15 and the gun 14, as at terminals 21.

Secondary electrons and electrons rejected by the screen are collected at anode 17. Since the differing potentials of each crystal will result in variations in the electron current collected at anode 17, a signal similar to that produced at conductive backing 15 will be produced between the collecting anode 17 and the electron gun, as at terminals 22. This signal indirectly reflects the amplifying effect of the crystals in the mosaic because the potential difference of the various crystals is increased by the heavier electron flow within the crystals. A signal taken at terminals 22 may be preferable to one taken at terminals 21, in some cases.

Figure 2:
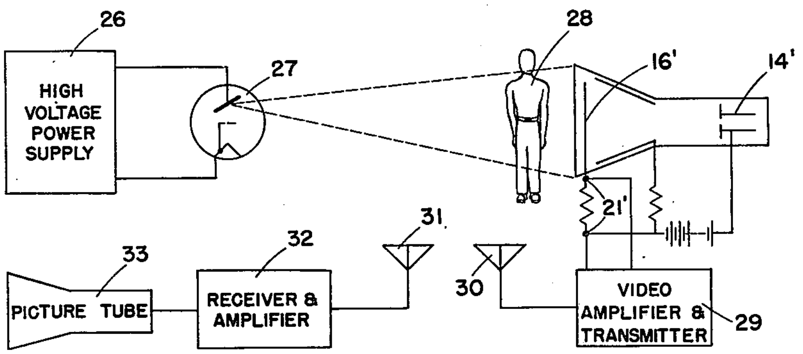
Fig. 2 illustrates how the X-ray image pick-up tube may be used with conventional circuitry to produce a video signal and a television picture.

Referring to Fig. 2, a block diagram is shown to illustrate how my novel pick-up tube may be used to transform X-ray images into visible fluorescent images by utilizing conventional video apparatus. Herein a high voltage power supply 26 feeds X-ray tube 27 which produces a beam irradiating subject 28. An X-ray image of the subject 28, such as might be employed to produce illumination of the screen of a fluoroscope, is permitted to fall upon the mosaic screen 16' of the pick-up tube. Electron gun 14' produces an electron beam which scans screen 16'. That side of screen 16' which, as described previously, consists of a mosaic of naturally amplifying crystals sensitive to X-rays, is scanned and produces a modulation of the current in screen 16' and hence a video signal across terminals 21'. This signal is fed into a video amplifier and transmitter 29 and thence to antenna 30. It is picked up at receiver antenna 31 and transmitted to video receiver and amplifier 32 which in turn feeds a signal to the picture tube 33. The scanning of the fluorescent target of picture tube 33 is synchronized with the scanning of the pick-up tube. The signal will cause a modulation of the electron beam in the picture tube according to the amount of signal impressed upon the pick-up tube which in turn varies with the intensity of the X-rays irradiating the particular area of the screen at any instant during the scanning thereof.

It is obvious that any direct wire or other type of video transmission could be used rather than the broadcast system illustrated.

Figure 3:
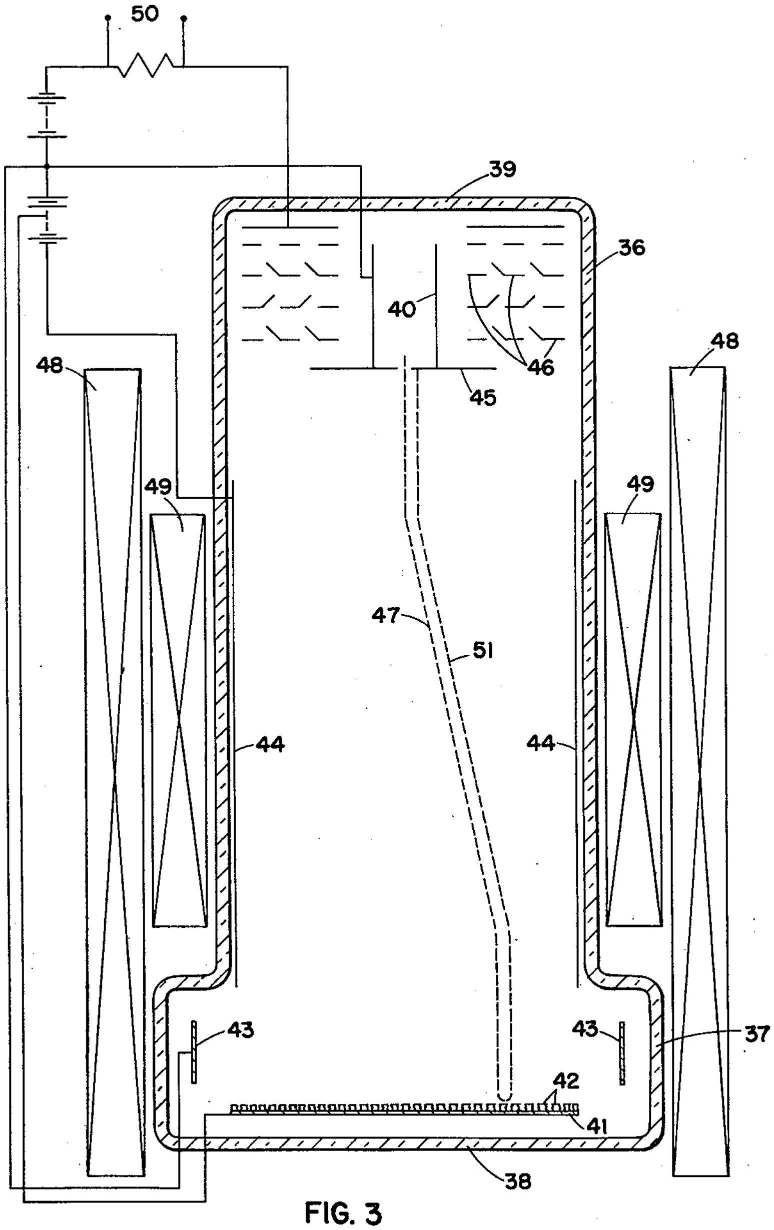
Fig. 3 represents another type of X-ray image pick-up tube.

Another type of pick-up tube, similar to the type known to the television art as the image orthicon is illustrated in Fig. 3. This tube consists of a vacuum envelope 36 which is generally tubular in shape and which has a short end portion 37 which is also tubular but of expanded diameter. The end walls of this vacuum envelope are generally circular, the wall at the enlarged end of the tube 38, being of material highly transparent to X-rays. The wall at the other end of the tube 39 will more likely be reentrant than planar as shown, since it is often convenient to employ a reentrant shape in order to include a stem press for filament leads and a structure upon which to mount an electron gun generally designated 40. The electron gun may be any conventional electron beam or cathode ray producing means. At the opposite end of the tube in the enlarged portion thereof is placed a screen member which, like that in the tube of Fig. 1, consists of a thin conductive backing 41 upon which is deposited a mosaic 42 of naturally amplifying crystals sensitive to X-rays. Decelerating electrode 43 is introduced between the electron beam producing means 40 and the target 41 just prior to the target. An anode 44 between the beam producing means and the target is advantageously formed by a conductive coating applied to the interior of the envelope 36. Collecting anode 45 is placed adjacent the electron gun and has a hole at its center through which the electron beam from the beam producing means 40 initially passes. Electron multiplying means 46 like that used in image orthicons is shown schematically.

During operation of this tube the electron gun 40 produces an electron beam 47. The beam continues in its axial motion through a field-free region defined by the conductive coating 44 to which a positive potential is applied which is often somewhat less positive than the accelerating electrodes of the electron gun. A uniform axial magnetic field is produced by conventional focussing coils 48 throughout the length of tube between the electron gun and the screen which field tends to keep the electron beam on the tube axis. Deflection of the beam is produced by deflection means 49, thus making possible the scanning of the target 41. Both focussing and deflection means of this type are commonly used with television pick-up tubes so that further explanation concerning them seems unnecessary. Once beyond the deflection means, the electron beam tends to gradually straighten out parallel to the tube's axis. The electron beam is decelerated to essentially zero velocity just prior to its striking the screen by means of decelerating electrode 43 which is maintained at cathode potential. Although the conductive backing 41 of the screen is kept at slightly positive potential, the scanning electron beam will cause the mosaic to charge to a negative potential where the cadmium sulphide, or other similar material is not rendered conductive by X-ray irradiation. An X-ray image passes through wall 38 and irradiates the screen. Because the conductive backing 41 is made of thin X-ray transparent material such as aluminum, the X-rays penetrate to and irradiate the mosaic 42. Each crystal irradiated will tend to conduct away to the conductive backing 41 the negative charge on its surface at a rate dependent upon the amount of X-radiation to which it is subjected. The conductive effect will be increased as described above by the amplifying effect of the crystals. Thus an intensified charge pattern will appear on the screen corresponding to the X-ray image. The electron beam scans this charged screen. Where crystals are rendered conductive so that some of their charge leaks away, electrons from the beam will be collected on the mosaic surface to replace the depleted charge. Electrons in the beam which are not needed to replace the charge on the screen will be repelled by the charge existent on the screen because of their low energy. Thus in effect a return beam of electrons 51 will be formed of varying electron density depending on the number of electrons taken to replace depleted charge. This modulated beam, controlled by the existing electric and magnetic fields which act upon beam 47, cause beam 48 to return toward its source. However, the change in the fields with time will cause sufficient deviation from the source to make beam 51 to impinge collecting anode 45. The signal produced by the modulated beam of electrons 51 may then be amplified by feeding it into the electron multiplier 46. The signal may then be taken between the output of electron multiplier 46 and the electron gun 40, as at terminal 50.

It is obvious that my invention is equally applicable to other types of pick-up tubes, other than those specifically described in the specification within the scope and spirit of the claims. Thus the scope of this invention includes broadly the use, in any type of pick-up tube, of material having its conductivity amplified by the action of X-rays whereby an X-ray image is converted into a dissected electron image suitable for amplification, transmission and reconstruction as a visual image in accordance with the procedures customarily practised in the television art.

It has been found that the response to X-rays is aided by biasing certain materials exhibiting this effect with green light. Such a light is indicated in Fig. 1 by numeral 52. Any pick-up tube utilizing this and other means of obtaining improved performance of the amplifying action of the crystals is within the scope and spirit of my invention.

I claim:

1. A pick-up tube for televising X-ray images, comprising a vacuum envelope, an electron beam producing means at one end of the envelope, and a screen mounted in the other end of the envelope to be irradiated by an X-ray image and simultaneously scanned by an electron beam, said screen consisting solely of a single continuous conductive backing permeable to X-rays and a single overlying layer of material having the property of amplifying currents initiated therein by the action of X-rays which layer of material is located directly in the path of the electron beam and is conductively affixed to that side of the conductive member scanned by the electron beam.

2. A pick-up tube for televising X-ray images, comprising a vacuum envelope, an electron beam producing means at one end of the envelope, a screen mounted in the other end of the envelope to be irradiated by an X-ray image and simultaneously scanned by an electron beam, said screen consisting solely of a single continuous conductive backing permeable to X-rays and a single overlying layer of crystals having the property of amplifying currents initiated therein by the action of X-rays which layer of crystals is located directly in the path of the electron-beam and is conductively affixed to that side of the conductive member scanned by the electron beam, and a collecting anode for electrons repelled by or ejected from the screen.

3. A pick-up tube for televising X-ray images, comprising a vacuum envelope, an electron beam producing means in one end of the envelope, a screen in the other end of the envelope to be irradiated by an X-ray image and simultaneously scanned by the electron beam, said screen consisting solely of a single continuous conductive backing permeable to X-rays and a single overlying layer of crystals having the property of amplifying currents initiated therein by the action of X-rays which layer of crystals is conductively affixed to that side of the conductive member scanned by the electron beam, and a conductive coating on the wall of the tube which acts as collecting anode for electrons repelled by or rejected from the screen.

4. A pick-up tube for televising X-ray images comprising a vacuum envelope, an electron beam producing means, in one end of the envelope, a screen in the other end of the envelope to be irradiated by an X-ray image and simultaneously scanned by an electron beam, an anode for maintaining a field free region between the beam producing means and the screen and for collecting stray and secondary electrons, a decelerating electrode proximate to the screen and between the screen and electron producing means for reducing the velocities of electrons approaching the screen, said screen consisting solely of a single continuous conductive backing permeable to X-rays and a single overlying layer of crystals having the property of amplifying currents initiated therein by the action of X-rays which layer of crystals is conductively affixed to that side of the conductive member scanned by the electron beam, a collecting electrode proximate the electron beam producing means which collects those electrons of the initial beam which are repelled by the screen, and an electron multiplying means whereby the electron signal collected at the collecting anode may be amplified.

5. A vacuum tube comprising in combination a screen disposed within said tube and comprising a layer of material which converts an invisible radiation image into electrical conductivity changes corresponding to said invisible image, and means for producing a beam of electrons modulated with said electrical conductivity changes on said screen, said means being separated from said screen, said layer furthermore having an uncovered surface presented to said means.

6. A device as defined in claim 5, which comprises in addition a source of light for irradiation of said screen when said screen is impinged by said invisible radiation.

7. A device as defined in claim 5, in which said screen comprises cadmium sulphide, said electron beam is a decelerated beam and which in addition comprises means for converting said electron beam into video signals.

8. A vacuum tube comprising in combination an electron gun for producing a beam of electrons, a screen spaced from said electron gun and comprising a layer of material which converts an invisible image into electrical conductivity changes corresponding to the invisible image, which layer is uncovered and disposed directly in the path of the beam of electrons produced by the electron gun for modulating the beam with said electrical conductivity changes, and means for receiving the modulated beam of electrons.

9. A tube as set forth in claim 8 in which said layer is of material reactive to X-rays.

10. A tube as set forth in claim 8 in which said layer is of cadmium sulphide.

11. A tube as set forth in claim 8 in which said layer is of germanium.

12. A tube as set forth in claim 8 which comprises in addition means for converting said modulated beam of electrons into electrical signals.

13. A tube as set forth in claim 8 in which said cathode includes a conducting plate on which said layer is superimposed.

14. A vacuum tube comprising in combination an electron gun for producing a beam of electrons, a screen spaced from said electron gun and comprising a layer of material which converts an invisible image impinging upon one side into electrical conductivity changes corresponding to the invisible image, the other side of said layer being exposed to the electron beam, and means for producing electrical signals corresponding to said electrical conductivity changes in the screen when said screen is bombarded by the electron beam.

15. A vacuum tube as set forth in claim 14 wherein said material is capable of converting an X-ray image.

16. A vacuum tube for televising X-ray images comprising a vacuum envelope, an electron beam producing means at one end of the envelope, and a screen spaced from said means and positioned to be irradiated by an X-ray image and simultaneously scanned by an electron beam from said means, said screen comprising a conductive backing permeable to X-rays and an overlying layer of material which converts an X-ray image into electrical conductivity changes corresponding to the image, which layer of material is located in the path of the electron beam and is conductively affixed to one side of the conductive backing.

References Cited in the file of this patent

UNITED STATES PATENTS

| | | |
|---|---|---|
| 2,156,392 | Iams | May 2, 1939 |
| 2,219,113 | Ploke | Oct. 22, 1940 |
| 2,442,287 | Edwards | May 25, 1948 |
| 2,507,958 | Cassman | May 16, 1950 |
| 2,544,754 | Townes | Mar. 13, 1951 |
| 2,555,091 | Lubszyinski | May 29, 1951 |
| 2,614,235 | Forgue | Oct. 14, 1952 |
| 2,622,219 | Schagen | Dec. 16, 1952 |
| 2,747,131 | Sheldon | May 22, 1956 |

OTHER REFERENCES

Zworykin and Ramberg's book on "Photo-Electricity and Its Application," Wiley & Sons, Inc., New York, 1949 ed., article on "Photoconductive Effect in Cadmium Sulfide," pages 193–195.